(12) United States Patent
Lin et al.

(10) Patent No.: US 8,437,297 B2
(45) Date of Patent: May 7, 2013

(54) BASE STATION, MOBILE STATION AND COMMUNICATION METHOD THEREOF

(75) Inventors: Yi-Ting Lin, Yonghe (TW); Tsung-Yu Tsai, Shanhua Town (TW); Chun-Che Chien, Taipei (TW); Chun-Yen Hsu, Minxiong Township (TW)

(73) Assignee: Institute for Information Industry, Taipei (TW)

( * ) Notice: Subject to any disclaimer, the term of this patent is extended or adjusted under 35 U.S.C. 154(b) by 310 days.

(21) Appl. No.: 12/828,789

(22) Filed: Jul. 1, 2010

(65) Prior Publication Data
US 2011/0002287 A1 Jan. 6, 2011

Related U.S. Application Data

(60) Provisional application No. 61/222,120, filed on Jul. 1, 2009.

(51) Int. Cl.
*H04W 4/00* (2009.01)
(52) U.S. Cl.
USPC .......................................... 370/329; 370/229
(58) Field of Classification Search ............. 370/329, 370/229–235, 341, 348; 455/450, 451, 452.1, 455/452.2, 464, 509–512
See application file for complete search history.

(56) References Cited

U.S. PATENT DOCUMENTS

| | | | | |
|---|---|---|---|---|
| 5,974,134 A | * | 10/1999 | Park | 379/242 |
| 7,133,421 B1 | * | 11/2006 | Puhakainen et al. | 370/498 |
| 2003/0128658 A1 | * | 7/2003 | Walton et al. | 370/208 |
| 2004/0062226 A1 | * | 4/2004 | Uhlik | 370/345 |
| 2004/0063450 A1 | * | 4/2004 | Uhlik | 455/517 |
| 2007/0189197 A1 | * | 8/2007 | Kwon et al. | 370/319 |
| 2008/0225783 A1 | * | 9/2008 | Wang et al. | 370/329 |
| 2009/0052464 A1 | * | 2/2009 | Gardner et al. | 370/436 |
| 2009/0088175 A1 | * | 4/2009 | Pelletier et al. | 455/450 |
| 2010/0278074 A1 | * | 11/2010 | Ke et al. | 370/254 |

* cited by examiner

*Primary Examiner* — Gary Mui
(74) *Attorney, Agent, or Firm* — Skaar Ulbrich Macari, P.A.

(57) ABSTRACT

A base station, a mobile station and a communication method thereof are provided. The base station and the mobile station are adapted for use in a wireless network. The wireless network comprises the base station and the mobile station. The mobile station connects with the base station via a physical channel. The physical channel comprises a plurality of resource units. Each resource unit comprises a sub-block. The sub-block comprises a sequence. The mobile station communicates with the base station with the sequence during the sub-block bases on a mapping relation.

18 Claims, 17 Drawing Sheets

BASE STATION, MOBILE STATION AND COMMUNICATION METHOD THEREOF

PRIORITY

This application claims the benefit of U.S. Provisional Application Ser. No. 61/222,120, filed on Jul. 1, 2009, which is hereby incorporated by reference.

FIELD

The present invention relates to a base station, a mobile station and a communication method thereof. More particularly, the base station, the mobile station and the communication method thereof of the present invention are for use in a wireless network system which connects with different user equipments.

BACKGROUND

Wireless communication technologies are widely used in nowadays. FIG. 1A illustrates the schematic view of a conventional wireless communication system 1. In the conventional wireless communication system 1, a first mobile apparatus 11 connects with a base station 13 via a channel 17. Please refer to FIG. 1B at the same time, FIG. 1B illustrates a schematic view of the channel 17. The channel 17 comprises a plurality of resource blocks 171. Each of the resource blocks 171 comprises a plurality of sub-blocks 173. Further, a plurality of sequences 175 can be defined in each of the sub-blocks 173, and the sequences 175 may have good correlation property among each other.

When the first mobile apparatus 11 needs to obtain the usage of the uplink bandwidth provided by the base station 13, the mobile 11 chooses one of the sequences 175 randomly and transmits the sequence 175 in one of the sub-block 173. Rest spaces 177 in the sub-block 173 can be used to transmit an access message which includes some additional information such as used identifier etc. In such mechanism, if there is no other user requesting for the bandwidth in the sub-block 173 chosen by the first mobile apparatus 11, the base station 13 can decode the access message directly and reply the decision of requesting the bandwidth to the first mobile apparatus 11.

However, if a second mobile apparatus which needs to obtain the usage of the uplink bandwidth provided by the base station 13 uses the same sub-block 173 used by the first mobile apparatus 13, it is difficult for the base station 13 to decode the access messages from the first mobile apparatus 11 and the second mobile apparatus since the access messages may be collided in the same sub-block 173.

Since both the first mobile apparatus 11 and the second mobile apparatus choose the sequence randomly, they may choose the same sequence 175 in the same sub-block 173. Accordingly, the base station 13 can misunderstand that there is only one mobile apparatus requesting for the bandwidth so that result in a system error.

Moreover, in order to identify the different mobile apparatus, the access message from the mobile apparatus needs to comprise an identifier so that the base station 13 can recognize the different mobile apparatus. However, comprising the identifier causes the reduction of the usable spaces of the access message.

Therefore, a mechanism for addressing the above problems is needed.

SUMMARY

An objective of certain embodiments of the invention is to provide a communication method for a base station. The base station is adapted for use in a wireless network. The wireless network comprises a first mobile station and the base station. The first mobile station connects with the base station via a physical channel. The physical channel comprises a plurality of resource units. Each resource unit comprises a first sub-block. The first sub-block comprises a first sequence. The communication method comprises the following steps: (a) enabling the base station to assign a first identifier for both the first sub-block and the first sequence of the first sub-block; (b) enabling the base station to create a mapping table for recording a first relation of mapping the first identifier to the first mobile station; (c) enabling the base station to transmit the first identifier to the first mobile station for informing the first mobile station to communicate with the base station with the first sequence during the first sub-block according to the first relation; and (d) enabling the base station to receive network messages from the first mobile station with the first sequence during the first sub-block according to the first relation after step (c).

Another objective of certain embodiments of the invention is to provide a base station for use in a wireless network. The wireless network comprises a first mobile station and the base station. The first mobile station connects with the base station via a physical channel The physical channel comprises a plurality of resource units. Each resource unit comprises a first sub-block. The first sub-block comprises a first sequence. The base station comprises a processing unit, a memory and a transceiver. The processing unit is configured to assign a first identifier for both the first sub-block and the first sequence of the first sub-block, and to create a mapping table for recording a first relation of mapping the first identifier to the first mobile station. The memory is configured to store the mapping table. The transceiver is configured to transmit the first identifier to the first mobile station for informing the first mobile station to communicate with the base station with the first sequence during the first sub-block according to the first relation and to receive network messages from the first mobile station with the first sequence during the first sub-block according to the first relation.

Yet another objective of certain embodiments of the invention is to provide a communication method for a mobile station. The mobile station is adapted for use in a wireless network. The wireless network comprises a base station and the mobile station, the mobile station connecting with the base station via a physical channel, the frequency channel comprising a plurality of resource units. Each resource unit comprises a first sub-block. The first sub-block comprises a first sequence. The communication method comprises the following steps: (a) enabling the mobile station to receive a mapping identifier from the base station, wherein the mapping identifier informs the mobile station to communicate with the base station with the first sub-block and the first sequence of the first sub-block; and (b) enabling the mobile station to transmit network messages to the base station according to the mapping identifier with the first sequence of the first sub-block during the first sub-block.

Another objective of certain embodiments of the invention is to provide a mobile station for use in a wireless network. The wireless network comprises the mobile station and a base station. The mobile station connects with the base station via a physical channel. The physical channel comprises a plurality of resource units. Each resource unit comprises a first sub-block. The first sub-block comprises a first sequence. The mobile station comprises a transceiver. The transceiver is configured to receive a mapping identifier, which informs the mobile station to communicate with the base station with the first sub-block and the first sequence of the first sub-block, from the base station, and to transmit network messages to the base station according to the mapping identifier with the first sequence of the first sub-block during the sub-block.

The base station and the communication method of the present invention address the problems present in the prior art, and improve the efficiency of the communications in the current wireless network systems.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to various example embodiments; nevertheless, these example embodiments are not intended to limit the present invention to any specific environment, example, embodiment, applications, or particular implementations described in these embodiments. Therefore, descriptions of these example embodiments are only provided for purpose of illustration but not to limit the present invention. It should be appreciated that elements unrelated directly to the present invention are omitted from the example embodiments and the attached drawings.

Figure 1A:
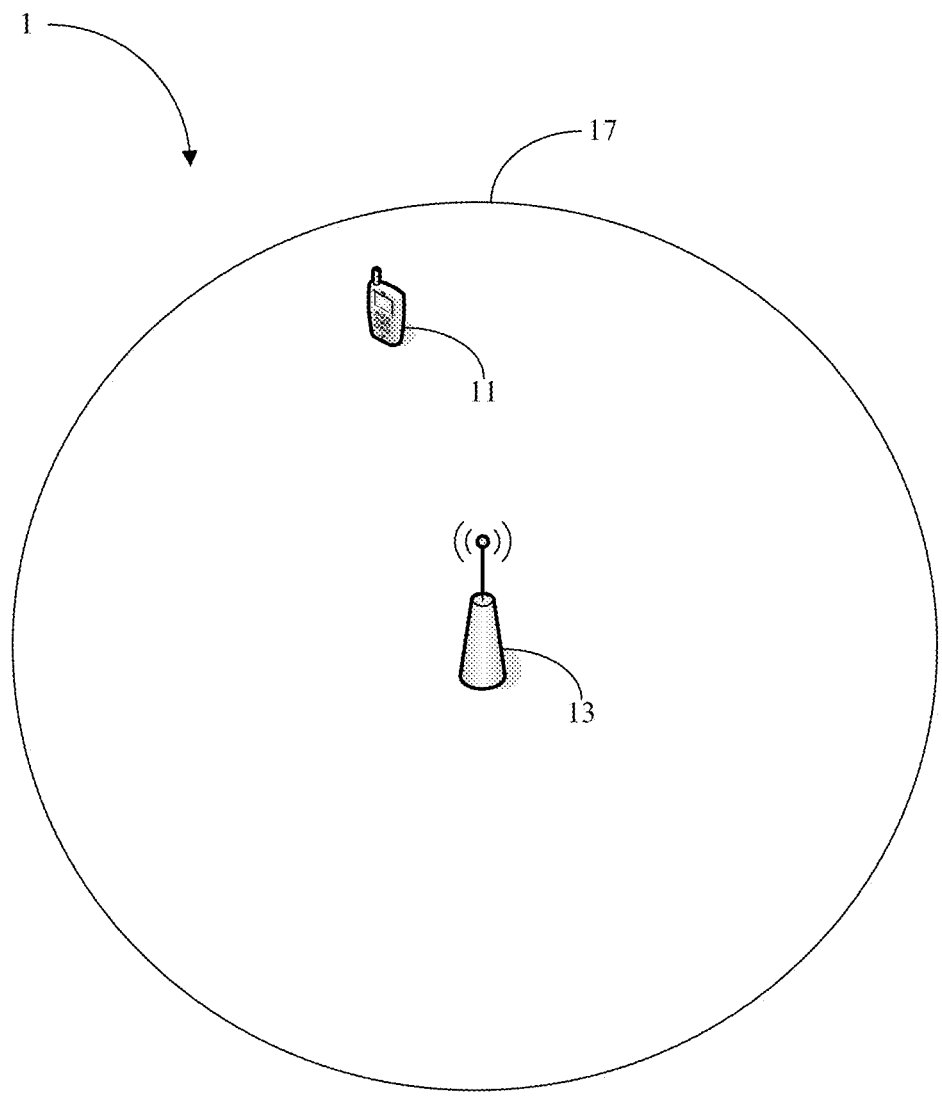
FIGS. 1A-1B illustrate a prior art wireless network.
Figure 1B:
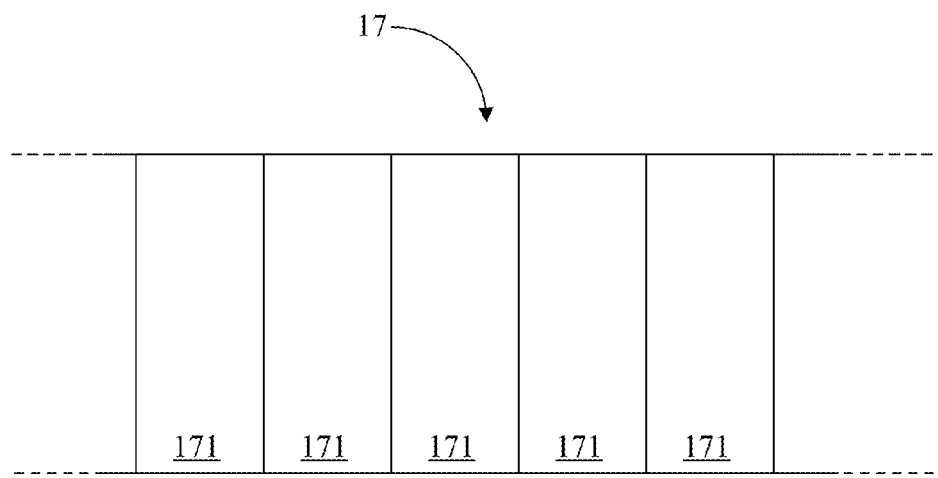
Figure 1B:
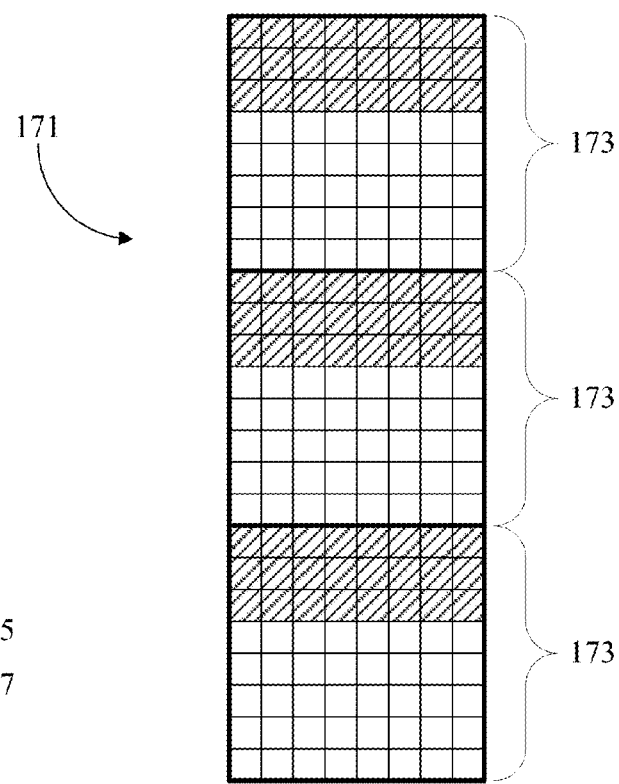
Figure 2A:
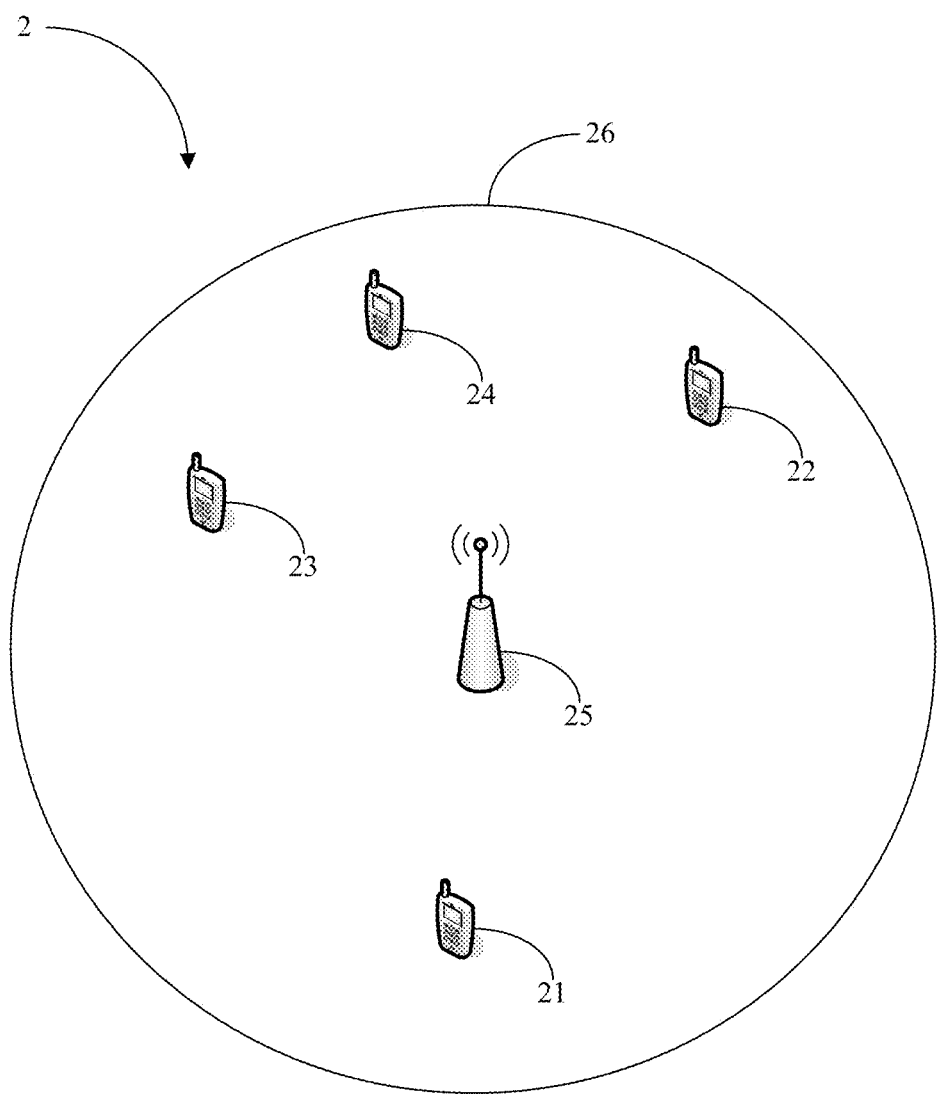
FIG. 2A illustrates a wireless network of a first example embodiment of the present invention.

FIG. 2A illustrates a wireless network system 2 of a first embodiment of the present invention. The wireless network system 2 comprises a first mobile station 21, a second mobile station 22, a third mobile station 23, a fourth mobile station 24 and a base station 25. The first mobile station 21, the second mobile station 22, the third mobile station 23 and the fourth mobile station 24 connect with the base station 25 via a physical channel 26.

Figure 2C:
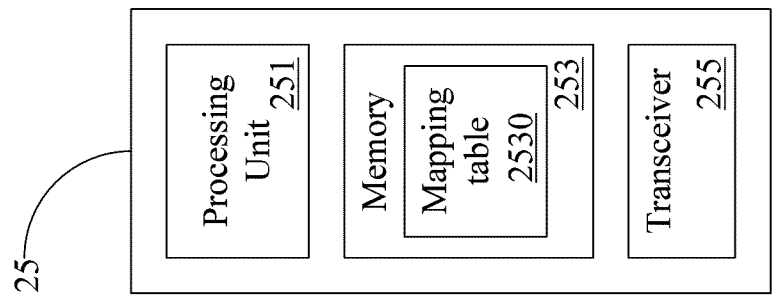
FIG. 2C illustrates a schematic view of the base station of the first example embodiment.
Figure 2B:
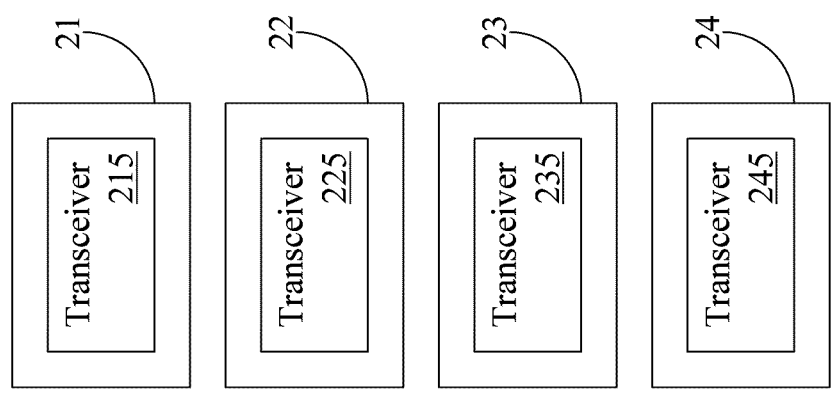
FIG. 2B illustrates a schematic view of the mobile stations of the first example embodiment.

The mobile stations 21-24 comprise a transceiver 215, a transceiver 225, a transceiver 235 and a transceiver 245 respectively as drawn in FIG. 2B. The base station 25 comprises a processing unit 251, a memory 253 and a transceiver 255 as drawn in FIG. 2C. The processing unit may be any of various processors, central processing units (CPUs), microprocessors, or other computing devices known to people skilled in the art. In addition, the memory may be any kind of various storage mediums and the transceivers may be any of various transceivers that known to people skilled in the art.

Figure 2D:
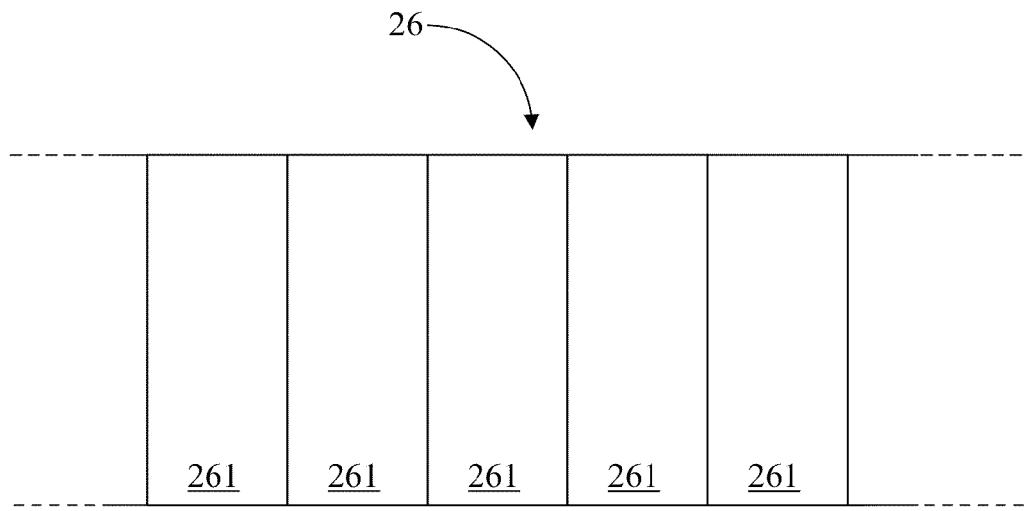
FIG. 2D illustrates a schematic view of the physical channel of the first example embodiment.
Figure 2D:
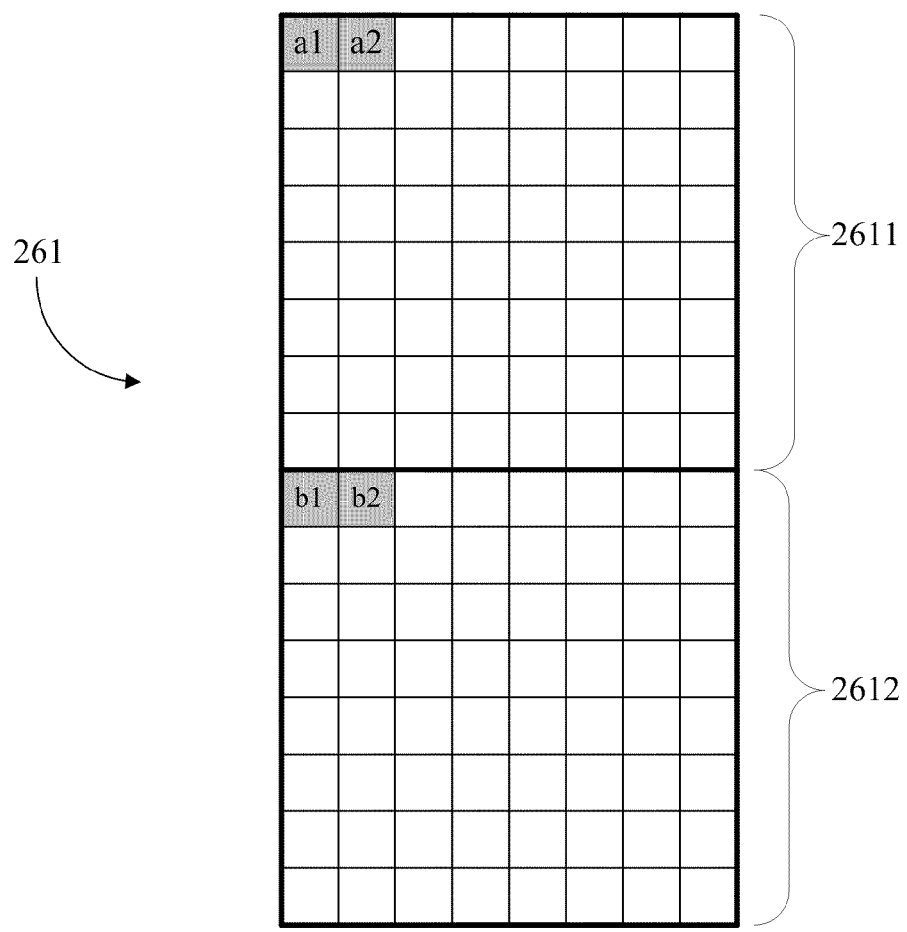

Please refer to FIG. 2D at the same time, the physical channel 26 comprises a plurality of resource units 261. Each resource unit 261 comprises a first sub-block 2611 and a second sub-block 2612. The first sub-block 2611 comprises a first sequence a1 and a second sequence a2 and the second sub-block 2612 comprises a first sequence b1 and the second sequence b2. In order to avoid the interferences, the sequences have good correlation properties among each other (e.g. the correlations are smaller enough).

Figure 2E:
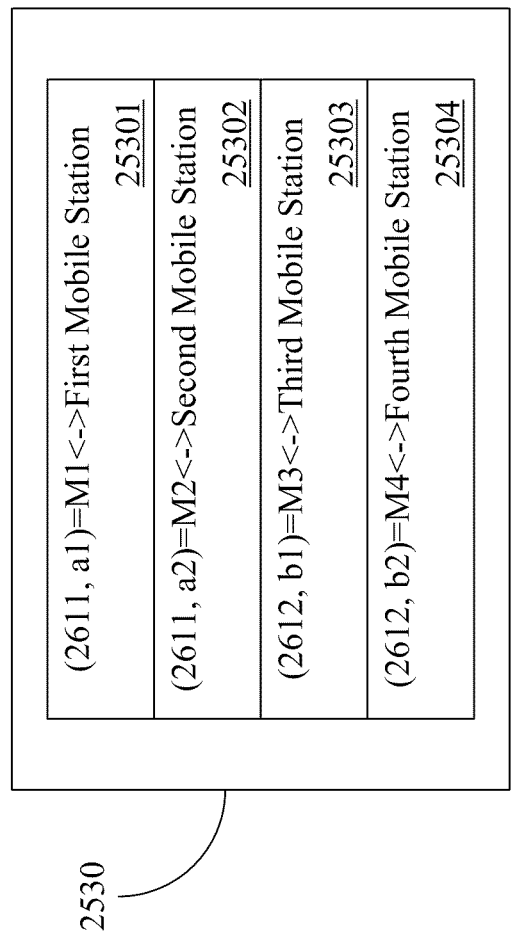
FIG. 2E illustrates a schematic view of the mapping table of the first example embodiment.

Please refer to FIG. 2E at the same time. At first, the processing unit 251 of the base station 25 assigns a first identifier M1 for both the first sub-block 2611 and the first sequence a1 of the first sub-block 2611, a second identifier M2 for both the first sub-block 2611 and the second sequence a2 of the first sub-block 2611, a third identifier M3 for both the second sub-block 2612 and the first sequence b1 of the second sub-block 2612 and a fourth identifier M4 for both the second sub-block 2612 and the second sequence a2 of the second sub-block 2612. Then the processing unit 251 creates a mapping table 2530 for recording a first relation 25301, a second relation 25302, a third relation 25303 and a fourth relation 25304. The mapping table 2530 is stored in the memory 253 of the base station 25. The first relation 25301 maps the first identifier M1 to the first mobile station 21, the second relation 25302 maps the second identifier M2 to the second mobile station 22, The third relation 25303 maps the third identifier M3 to the third mobile station 23 and the fourth relation 25304 maps the fourth identifier M4 to the fourth mobile station 24.

After mapping, the base station 25 informs the mapping to the mobile stations 21-24 respectively. Specifically, the transceiver 255 transmits the first identifier M1 to the first mobile station 21 for informing the first mobile station 21 to communicate with the base station 25 with the first sequence a1 during the first sub-block 2611 according to the first relation 25301, to transmits the second identifier M2 to the second mobile station 22 for informing the second mobile station 22 to communicate with the base station 25 with the second sequence a2 during the first sub-block 2611 according to the second relation 25301, to transmits the third identifier M3 to the third mobile station 23 for informing the third mobile station 23 to communicate with the base station 25 with the first sequence b1 during the second sub-block 2612 according to the third relation 25303, and to transmits the fourth identifier M4 to the fourth mobile station 24 for informing the fourth mobile station 24 to communicate with the base station 25 with the second sequence b2 during the second sub-block 2612 according to the fourth relation 25304. And then the base station 25 can communicate with the mobile stations 21-24 directly.

Accordingly, as the first mobile station 21 as an example, if the first mobile station 21 intends to request bandwidth from the base station 25, the first mobile station 21 can transmits a request message with the sequence a1 during the sub-block 2611. After the transceiver 255 of the base station 25 receives the request message from the first mobile station 21 with the sequence a1 during the sub-block 2611, the base station 25 can determine that the request message is transmitted from the first mobile station 21 according to the first relation 25301 in the mapping table 2530 since the first relation 25301 indicates the identifier M1 of the sequence a1 and the sub-block 2611 maps to the first mobile station 21. Afterwards, the transceiver 251 of the base station 25 transmits messages to the first mobile station 21. It should be noted that the mobile station 22-24 communicate with the base station 25 as well as the first mobile station 21 does. Hence, the details of the communications between the mobile stations 22-24 and the base station 25 will not be further described again.

Based on the first embodiment, since the mobile stations 21-24 can communicate with the base station 25 individually according to the identifiers M1-M4 of the relations 25301-25304 of the mapping table 2530, the request messages from the mobile stations 21-24 do not need to add further information for identifying their selves respectively.

Figure 3:
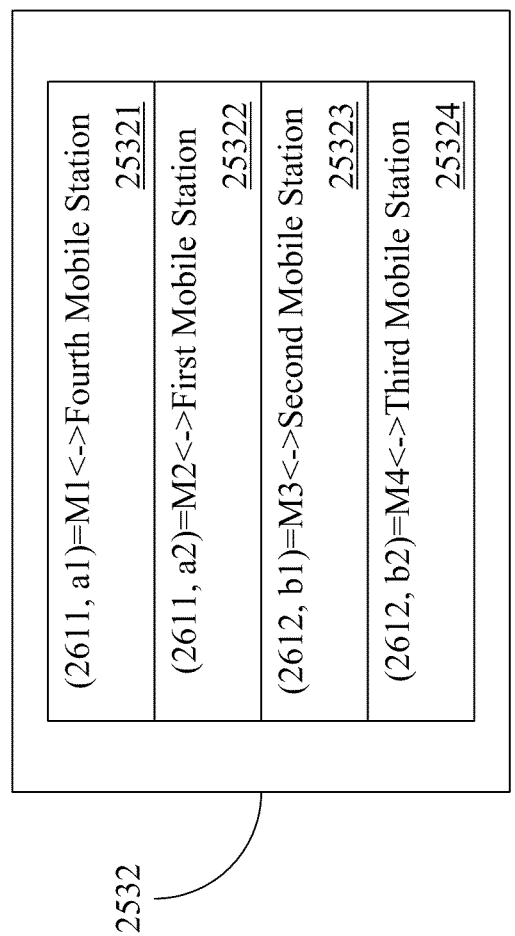
FIG. 3 illustrates a schematic view of the mapping table of a second example embodiment of the present invention.

Please refer to FIG. 3, it illustrates a mapping table 2532 of a second embodiment of the present invention. It shall be particularly noted that, in the second embodiment, most of the components are identical to those of the first embodiment; thus, the functions of the same components will not be further described herein. The differences between the first embodiment and the second embodiment are the mapping tables 2530, 2532. Particularly, in order to average the usages of the sub-blocks of the resource units, the mapping relations should be able to re-map dynamically. More specifically, it is possible that the second mobile 22 communicates with the base station 25 more frequent than the fourth mobile 24 does. Hence, the usages of the sub-blocks 2611, 2612 of the frequency 261 is unbalanced. Accordingly, the mapping table 2532 in the second embodiment is dynamic for averaging the usage of the sub-blocks 2611, 2612.

To achieve the dynamical mapping, the mobile stations 21-24 and the processing unit 251 of the base station 25 modify the mapping relations at the same time periodically. Specifically, at first, the processing unit 251 of the base station 25 modifies the first relation 25301 to a first relation 25321 which maps the first identifier M1 to the fourth mobile station 24, modifies the second relation 25302 to a second relation 25322 which maps the second identifier M2 to the first mobile station 21, modifies the third relation 25303 to a third relation 25323 which maps the third identifier M3 to the second mobile station 22, and modifies the fourth relation 25304 to a fourth relation 25324 which maps the fourth identifier M4 to the third mobile station 23. It should be noted that all the above modifications are done according to a re-mapping rule (not shown) in a time interval. The re-mapping rule can be achieved via any possible logical formulas; hence will be not described further hereinafter.

At the same time, based on the re-mapping rule, the fourth mobile station 24 communicates with the base station 25 with the first sequence a1 during the first sub-block 2611, the first mobile station 21 communicates with the base station 25 with the second sequence a2 during the first sub-block 2611, the second mobile station 22 communicates with the base station 25 with the first sequence b1 during the second sub-block 2612 and the third mobile station 23 communicates with the base station 25 with the second sequence b2 during the second sub-block 2612. It should be appreciated that the re-mapping rule can be predefined in the base station 25 and mobile stations 21-24 so that the base station 25 and the mobile station 21-24 can follow the re-mapping rule in the same way and at the same time.

Similarly, as the first mobile station 21 as example, if the first mobile station 21 intends to request bandwidth from the base station 25 after re-mapping, the first mobile station 21 transmits a request message with the second sequence a2 during the first sub-block 2611. After the transceiver 255 of the base station 25 receives the request message from the first mobile station 21 with the sequence a2 during the first sub-block 2611, the base station 25 can determine that the request message is transmitted from the first mobile station 21 according to the fourth relation 25322 in the mapping table 2532 since the second relation 25322 indicates the identifier M2 of the second sequence a2 and the first sub-block 2611 maps to the first mobile station 21. Afterwards, the transceiver 251 of the base station 25 may transmit a response message to the first mobile station 21.

It should be noted that the mobile station 22-24 communicate with the base station 25 as well as the first mobile station 21 does after re-mapping. Hence, the details of the communications between the mobile stations 22-24 and the base station 25 will not be further described again. Based on the disclosures of the second embodiment, the usages of the sub-blocks 2611, 2612 can be averaged by the dynamic re-mapping mechanism.

Figure 4:
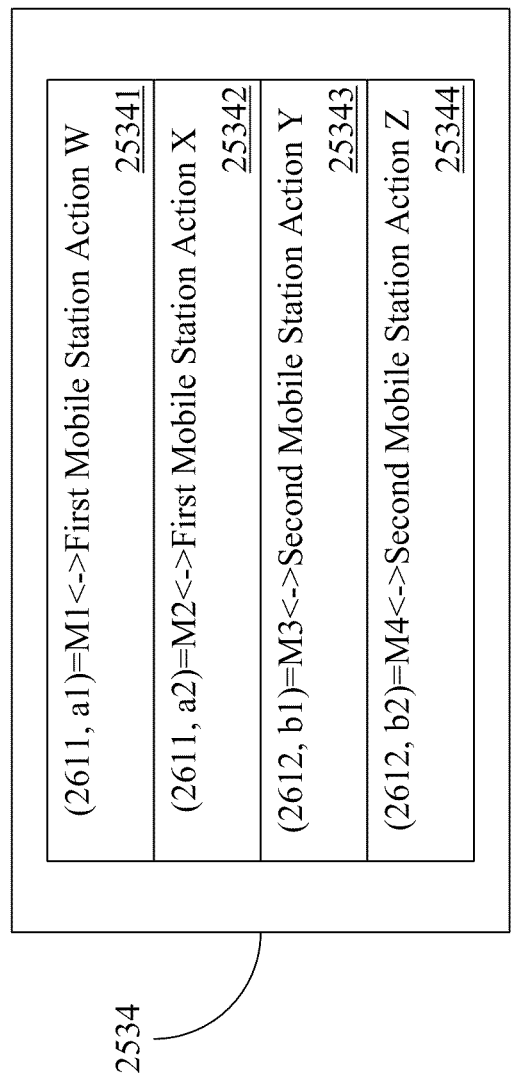
FIG. 4 illustrates a schematic view of the mapping table of a third example embodiment of the present invention.

FIG. 4 illustrates a third embodiment of the present invention. Similarly, it shall be particularly noted that, in the third embodiment, most of the components are identical to those of the first embodiment; thus, the functions of the same components will not be further described herein. The differences between the first embodiment and the third embodiment are the scenario and the mapping relations.

Particularly, in the scenario used in the third embodiment, only mobile stations 21-22 connect with the base station 25. Similarly, at first, the processing unit 251 of the base station 25 assigns the first identifier M1 for both the first sub-block 2611 and the first sequence a1 of the first sub-block 2611, a second identifier M2 for both the first sub-block 2611 and the second sequence a2 of the first sub-block 2611, a third identifier M3 for both the second sub-block 2612 and the first sequence b1 of the second sub-block 2612 and a fourth identifier M4 for both the second sub-block 2612 and the second sequence b2 of the second sub-block 2612. Then the processing unit 251 creates a mapping table 2534 for recording a first relation 25341, a second relation 25342, a third relation 25343 and a fourth relation 25344. Different from the mapping relations 25301-25304 in the first embodiment, the first relation 25341 maps the first identifier M1 to a default action W of the first mobile station 21, the second relation 25342 maps the second identifier M2 to a default action X of the first mobile station 21, the third relation 25343 maps the third identifier M3 to a default action Y of the second mobile station 22 and the fourth relation 25344 maps the fourth identifier M4 to a default action Z of the second mobile station 22.

Accordingly, when the first mobile station 21 intends to request the base station 25 to execute the action W, the first mobile station 21 can transmit a request message with the sequence a1 during the sub-block 2611. Specifically, after the transceiver 255 of the base station 25 receives networks messages from the first mobile station 21 with the sequence a1 during the sub-block 2611, the processing unit 251 of the base station 25 executes the default action W according to the first relation 25341 of the mapping table 2534 since the first relation 25341 indicates the first identifier M1 of the action W for the first mobile station 21. Similarly, the mobile stations 21-22 can inform the base station 25 to execute the actions X, Y, Z based on the relations 25342-25344 of the mapping table 2534. It should be noted that one or more default actions for the same mobile station can mapped to one or more relations, the above embodiment is not intended to limit the possible actions for the mobile stations.

Based on the third embodiment, the mapping mechanism of the present invention can not only use for identifying the mobile stations, but for identifying the actions which the mobile stations intend to execute.

Figure 5A:
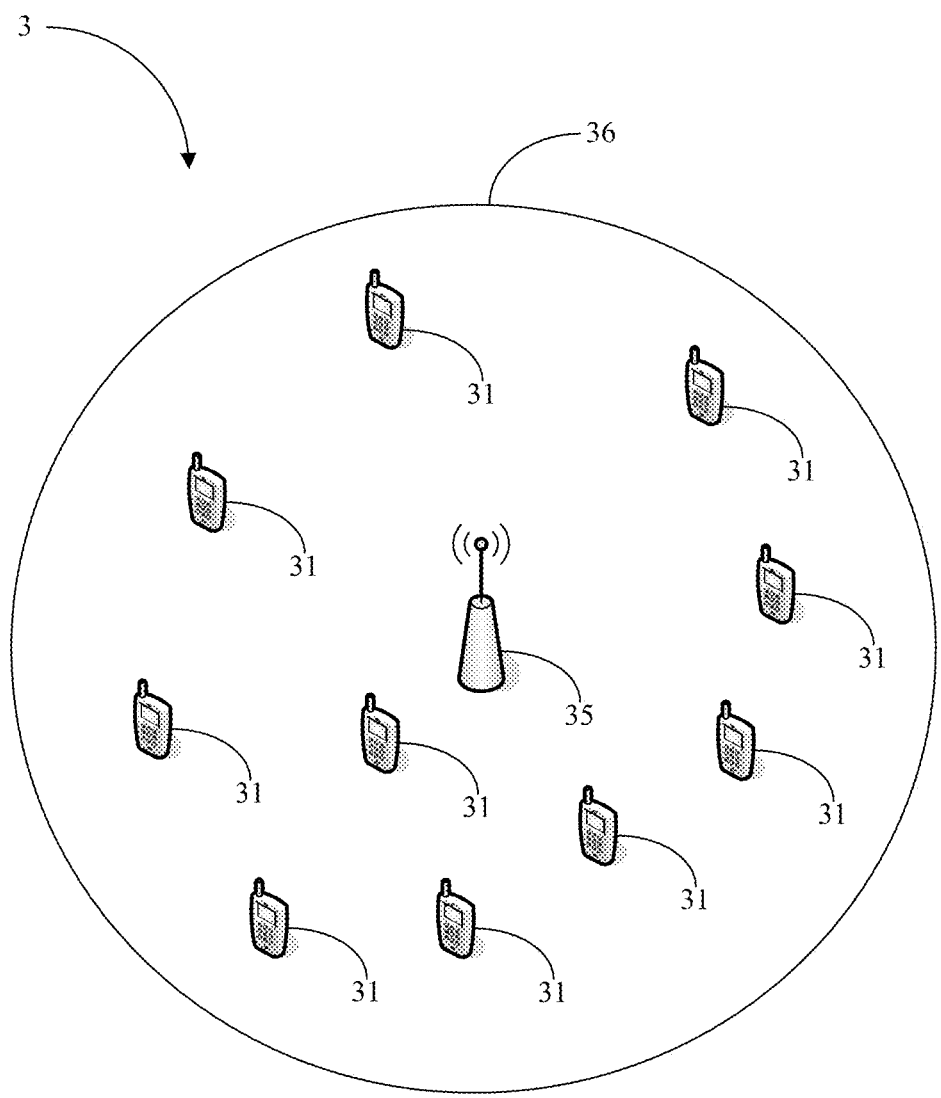
FIG. 5A illustrates a wireless network of a fourth example embodiment of the present invention.

It should be noted that, for the convenience to understand the present invention more clearly, the numbers of the mobile stations, the sub-blocks and the sequences in the embodiments are only for instance. However, it is not intended to limit the mobile stations, the sub-blocks or the sequences of the present to any specific number. More specifically, please prefer to FIG. 5A, it shows a fourth embodiment of the present invention. In the fourth embodiment, a wireless network system 3 comprises a plurality of mobile stations 31 and a base station 35. The mobile stations 31 connect with the base station 35 via a physical channel 36.

Figure 5B:
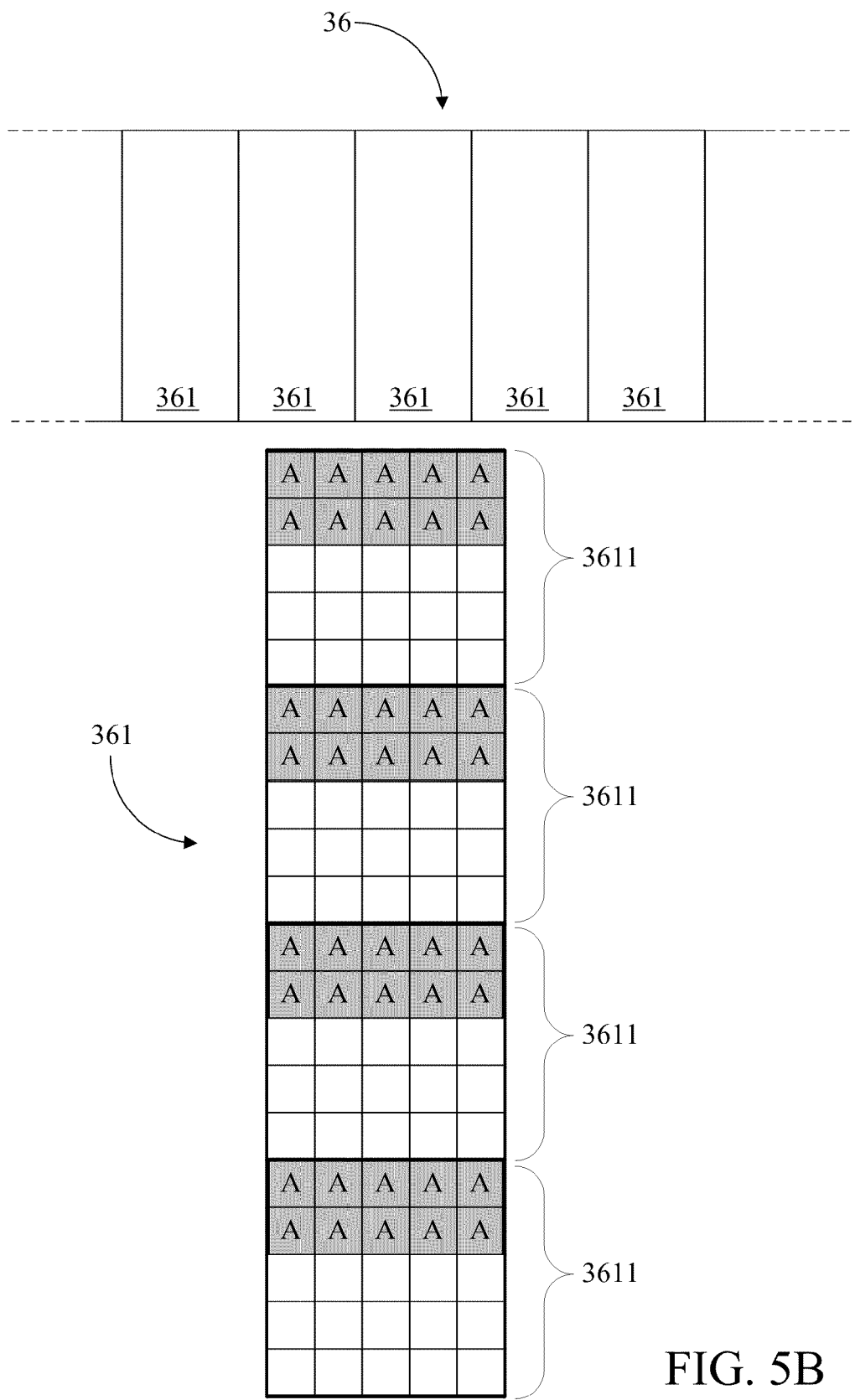
FIG. 5B illustrates a schematic view of the physical channel of the fourth example embodiment.

Please refer to FIG. 5B at the same time, the physical channel 36 comprises a plurality of resource units 361. Each resource unit 361 comprises a plurality of sub-blocks 3611. Each sub-block 3611 comprises a plurality of sequence A. Each pair of one sub-block 3611 and one sequence A can be used for identify one mobile station 31 based on the descriptions of the above embodiments. Accordingly, the implementation of multi users in the wireless network system 3 is achievable.

Figure 6A:
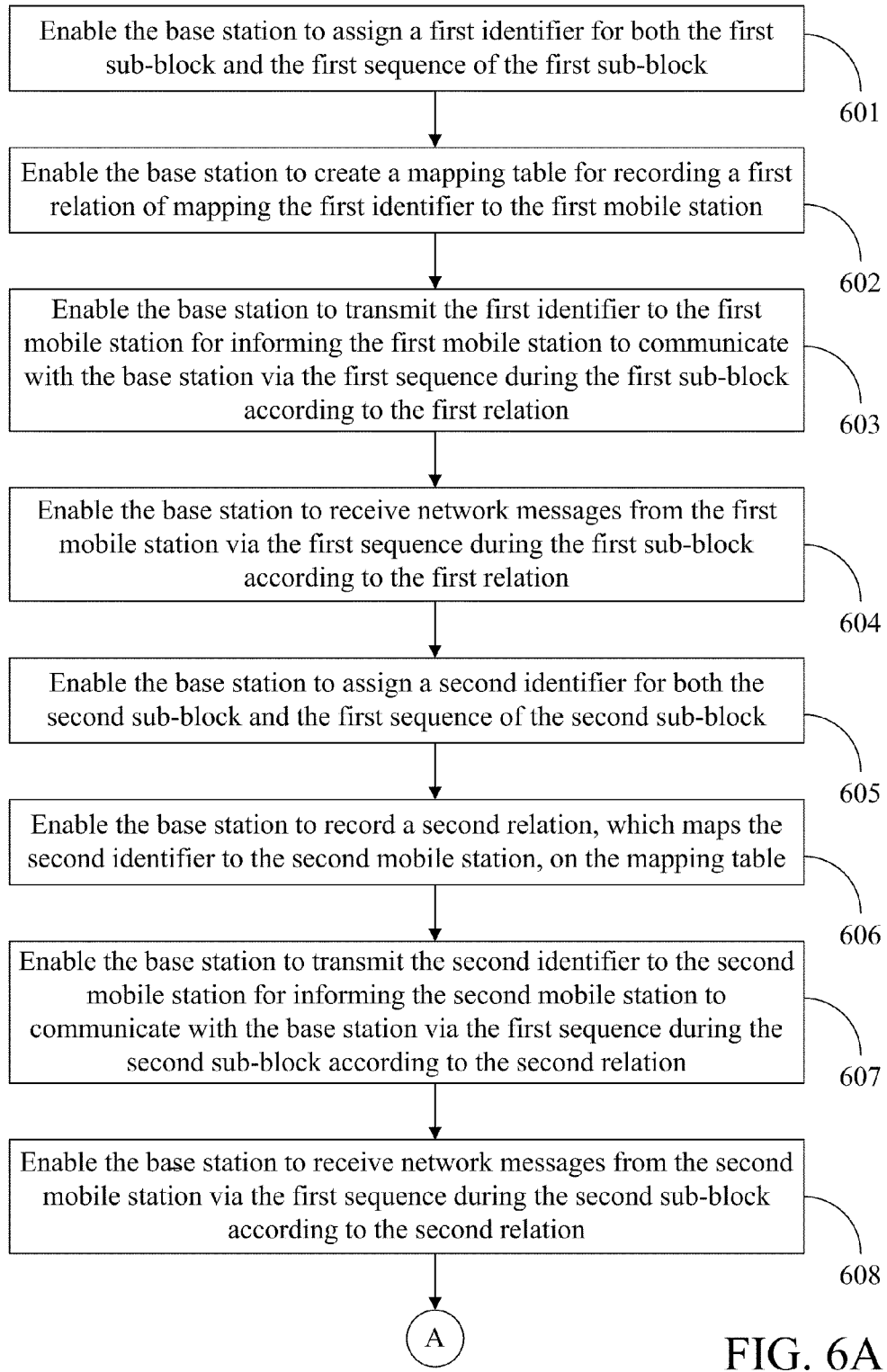
FIGS. 6A-6B illustrate the flowcharts of a fifth example embodiment of the present invention.
Figure 6B:
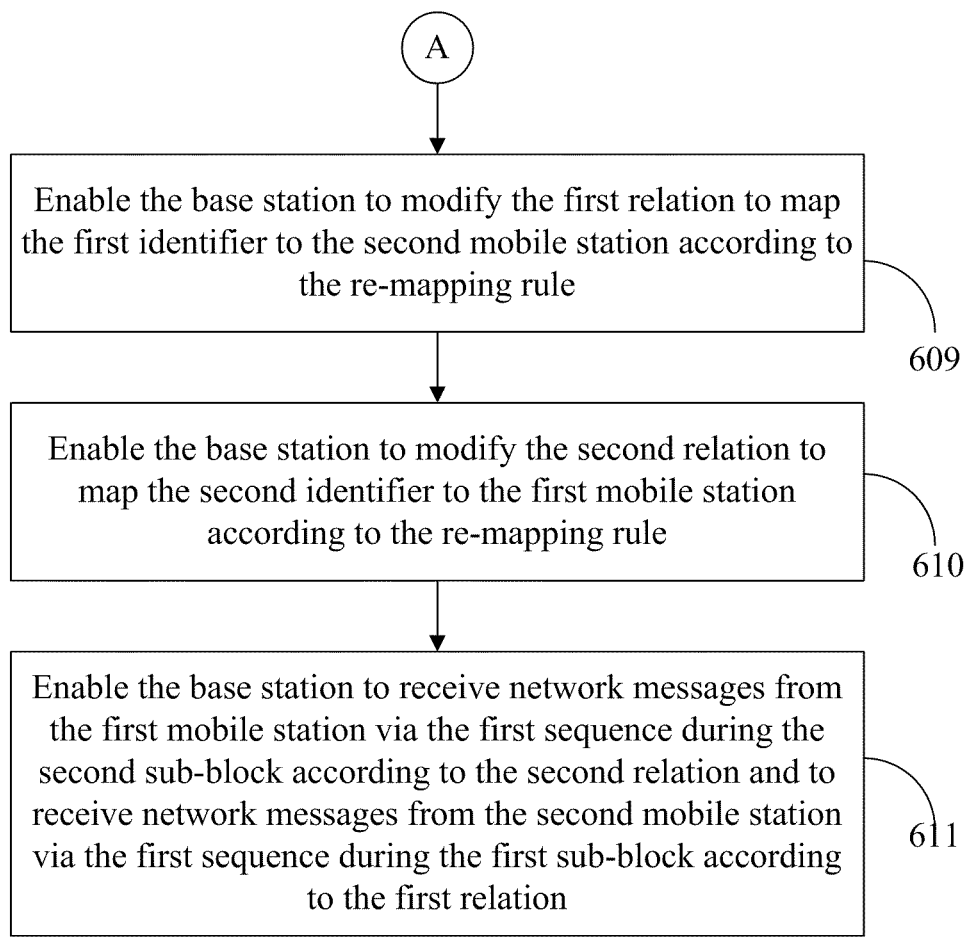

Please refer to FIGS. 6A-6B, a fifth embodiment of the present invention is a communication method for use in a base station, such as the base station 25 in a wireless network. The wireless network comprises a first mobile station and the base station. The first mobile station connects with the base station via a physical channel. The physical channel comprises a plurality of resource unit. Each resource unit comprises a first sub-block and a second sub-block. The first sub-block and the second sub-block comprise a first sequences respectively.

First, the communication method executes step 601 to enable the base station to assign a first identifier for both the first sub-block and the first sequence of the first sub-block. Then, step 602 is executed to enable the base station to create a mapping table for recording a first relation of mapping the first identifier to the first mobile station. Step 603 is executed to enable the base station to transmit the first identifier to the first mobile station for informing the first mobile station to communicate with the base station with the first sequence of the first sub-block during the first sub-block according to the first relation. Afterward, step 604 is executed to enable the base station to receive network messages from the first mobile station with the first sequence of the first sub-block during the first sub-block according to the first relation.

Next, step 605 is executed to enable the base station to assign a second identifier for both the second sub-block and the first sequence of the second sub-block. Step 606 is executed to enable the base station to record a second relation on the mapping table, wherein the second relation maps the second identifier to the second mobile station. Then, step 607 is executed to enable the base station to transmit the second identifier to the second mobile station for informing the second mobile station to communicate with the base station with the first sequence of the second sub-block during the second sub-block according to the second relation. Afterwards, step 608 is executed to enable the base station to receive network messages from the second mobile station with the first sequence of the second sub-block during the second sub-block according to the second relation.

It should be noted that, the mapping relations described above are fixed. If the usages of the sub-blocks need to be averaged, step 609-611 should be executed for dynamic mapping. Particularly, step 609 is executed to enable the base station to modify the first relation to map the first identifier to the second mobile station according to a re-mapping rule. Then, step 610 is executed to enable the base station to modify the second relation to map the second identifier to the first mobile station according to the re-mapping rule. Afterwards, step 611 is executed to enable the base station to receive network messages from the first mobile station with the first sequence of the second sub-block during the second sub-block according to the second relation and to receive network messages from the second mobile station with the first sequence of the first sub-block during the first sub-block according to the first relation. Accordingly, based on the above disclosures, the usages of the sub-blocks can be averaged by the dynamic re-mapping mechanism.

Figure 7A:
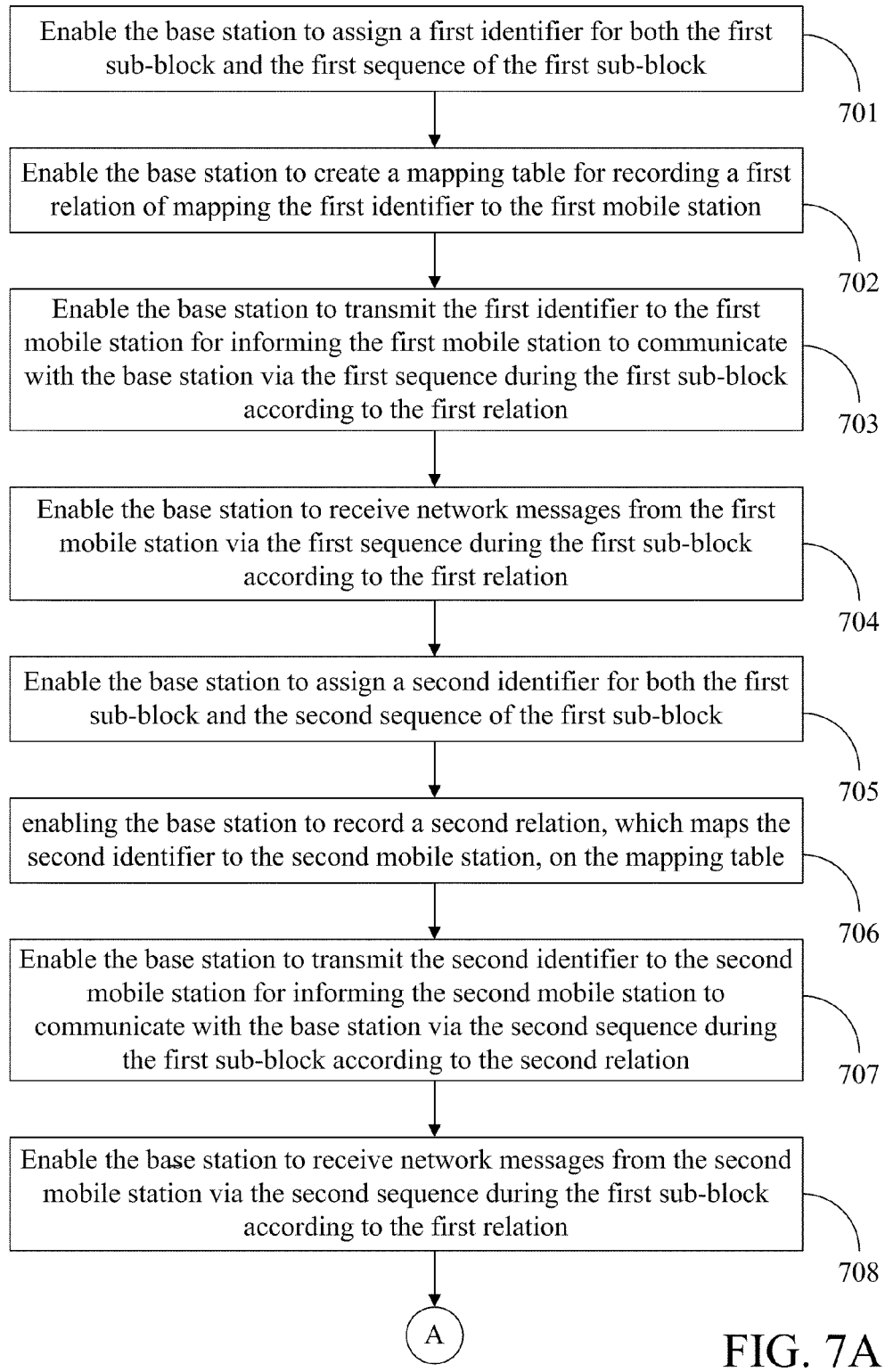
FIGS. 7A-7B illustrate the flowcharts of a sixth example embodiment of the present invention.
Figure 7B:
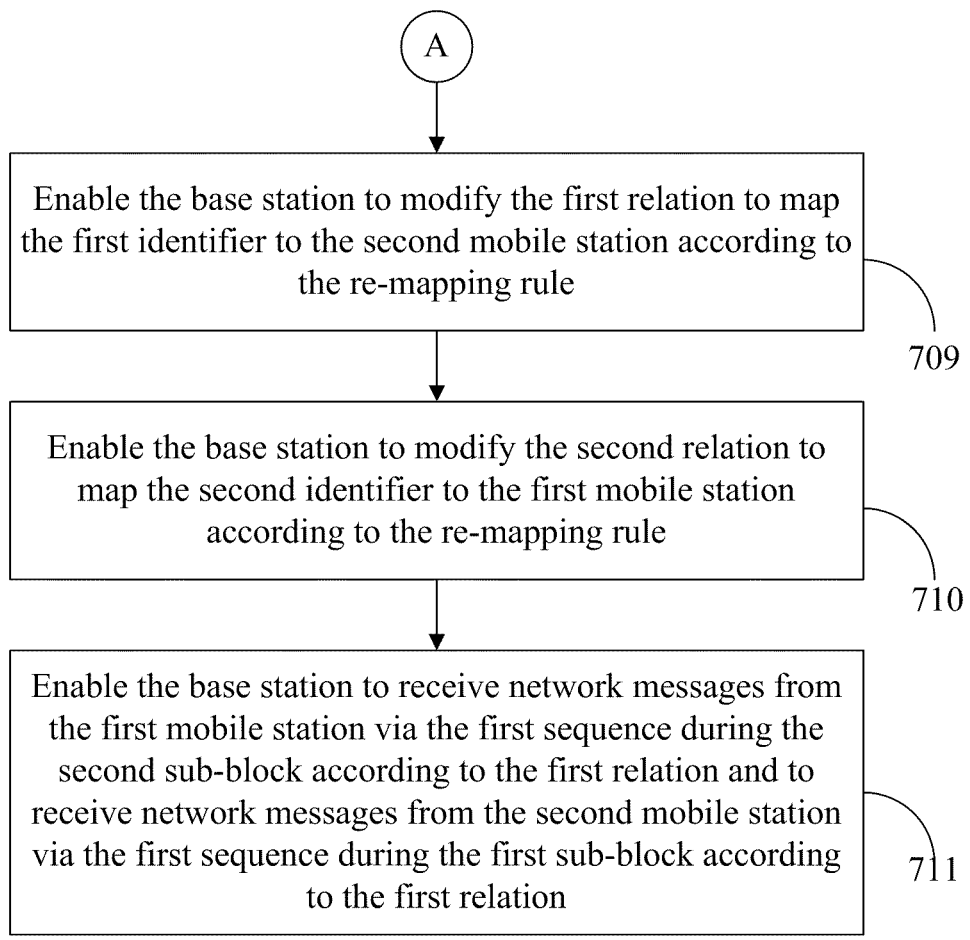

Please refer to FIGS. 7A-7B, a sixth embodiment of the present invention is a communication method for use in a base station, such as the base station 25 in a wireless network. The wireless network comprises a first mobile station and the base station. The first mobile station connects with the base station via a physical channel. The physical channel comprises a plurality of resource units. Each resource unit comprises a first sub-block. The first sub-block comprise a first sequences and a second sequence.

First, the communication method executes step 701 to enable the base station to assign a first identifier for both the first sub-block and the first sequence of the first sub-block. Then, step 702 is executed to enable the base station to create a mapping table for recording a first relation of mapping the first identifier to the first mobile station. Step 703 is executed to enable the base station to transmit the first identifier to the first mobile station for informing the first mobile station to communicate with the base station with the first sequence during the first sub-block according to the first relation. Afterward, step 704 is executed to enable the base station to receive network messages from the first mobile station with the first sequence during the first sub-block according to the first relation.

Next, step 705 is executed to enable to enable the base station to assign a second identifier for both the first sub-block and the second sequence of the first sub-block. Then, step 706 is executed to enable the base station to record a second relation on the mapping table, wherein the second relation maps the second identifier to the second mobile station. Step 707 is executed to enable the base station to transmit the second identifier to the second mobile station for informing the second mobile station to communicate with the base station with the second sequence during the first sub-block according to the second relation. Afterwards, step 708 is executed to enable the base station to receive network messages from the second mobile station with the second sequence during the first sub-block according to the first relation.

Similarly, step 709-711 could be executed for dynamic mapping. Particularly, step 709 is executed to enable the base station to modify the first relation to map the first identifier to the second mobile station according to a re-mapping rule. Step 710 is executed to enable the base station to modify the second relation to map the second identifier to the first mobile station according to the re-mapping rule. Afterwards, step 711 is executed to enable the base station to receive network messages from the first mobile station with the second sequence of the first sub-block during the first sub-block according to the second relation and to receive network messages from the second mobile station with the first sequence of the first sub-block during the first sub-block according to the first relation.

Figure 8:
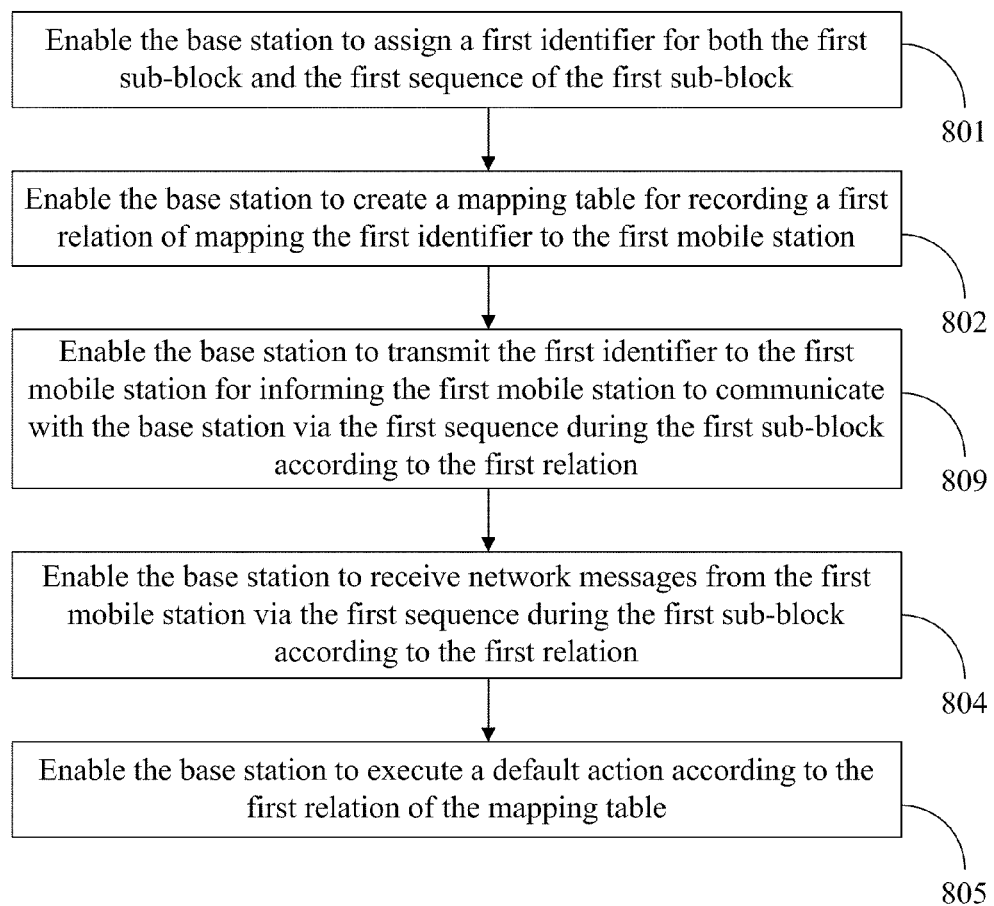
FIG. 8 illustrates the flowcharts of a seventh example embodiment of the present invention.

Please refer to FIG. 8, a seventh embodiment of the present invention is a communication method for use in a base station, such as the base station 25 in a wireless network. The wireless network comprises a first mobile station and the base station. The first mobile station connects with the base station via a physical channel. The frequency channel comprises a plurality of resource units. Each resource unit comprises a first sub-block. The first sub-block comprises a first sequence.

First, the communication method executes step 801 to enable the base station to assign a first identifier for both the first sub-block and the first sequence of the first sub-block. Then, step 802 is executed to enable the base station to create a mapping table for recording a first relation of mapping the first identifier to the first mobile station. Step 803 is executed to enable the base station to transmit the first identifier to the first mobile station for informing the first mobile station to communicate with the base station with the first sequence during the first sub-block according to the first relation. Step 804 is executed to enable the base station to receive network messages from the first mobile station with the first sequence during the first sub-block according to the first relation. Afterwards, step 805 is executed to enable the base station to execute a default action according to the first relation of the mapping table.

Figure 9:
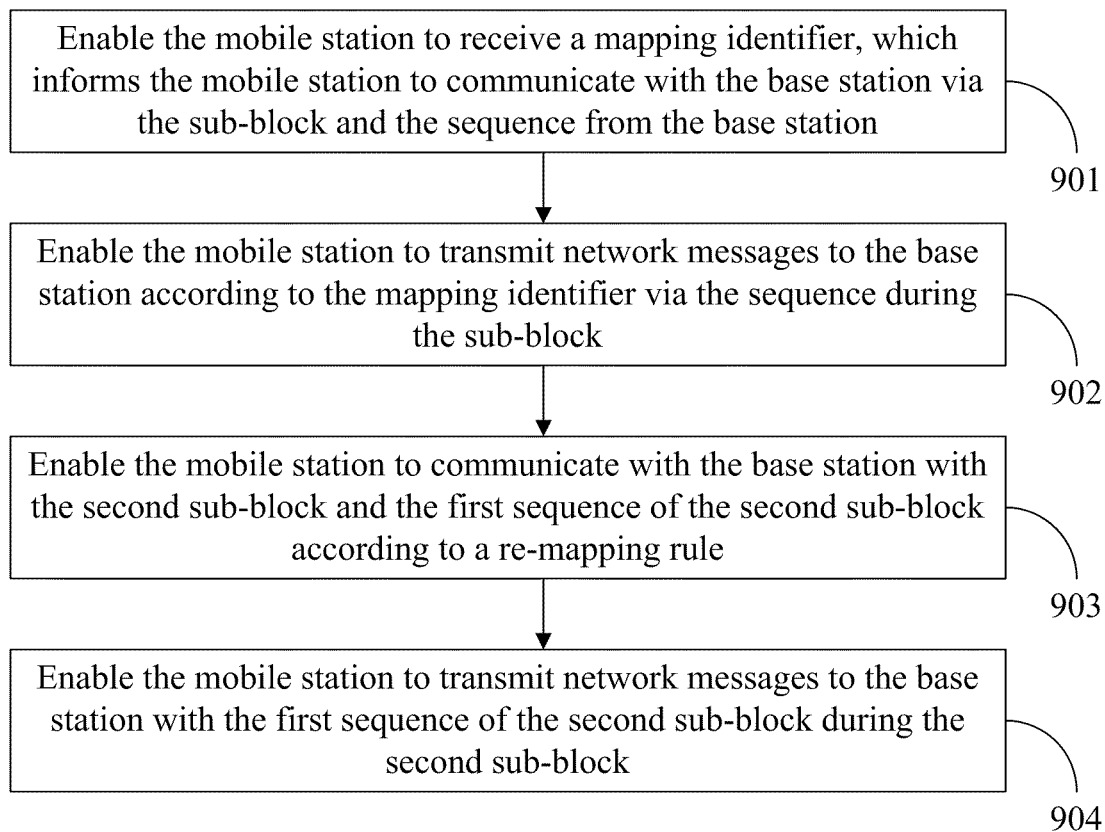
FIG. 9 illustrates the flowcharts of a eighth example embodiment of the present invention.

Please refer to FIG. 9, a eighth embodiment of the present invention is a communication method for use in a mobile station, such as the mobile stations 21-24 in a wireless network. The wireless network comprises a mobile station and the base station. The mobile station connects with the base station via a physical channel. The physical channel comprises a plurality of resource units. Each resource unit comprises a first sub-block and a second sub-block. The first sub-block and the second sub-block comprise a first sequence respectively.

First, step 901 is executed to enable the mobile station to receive a mapping identifier from the base station, wherein the mapping identifier informs the mobile station to communicate with the base station with the first sub-block and the first sequence. Next, step 902 is executed to enable the mobile station to transmit network messages to the base station according to the mapping identifier with the first sequence of the first sub-block during the first sub-block.

Similarly, in order to achieve the re-mapping mechanism, steps 903-904 are executed. Step 903 is executed to enabling the mobile station to communicate with the base station with the second sub-block and the first sequence of the second sub-block according to a re-mapping rule. Then, step 904 is executed to enable the mobile station to transmit network messages to the base station with the first sequence of the second sub-block during the second sub-block.

Figure 10:
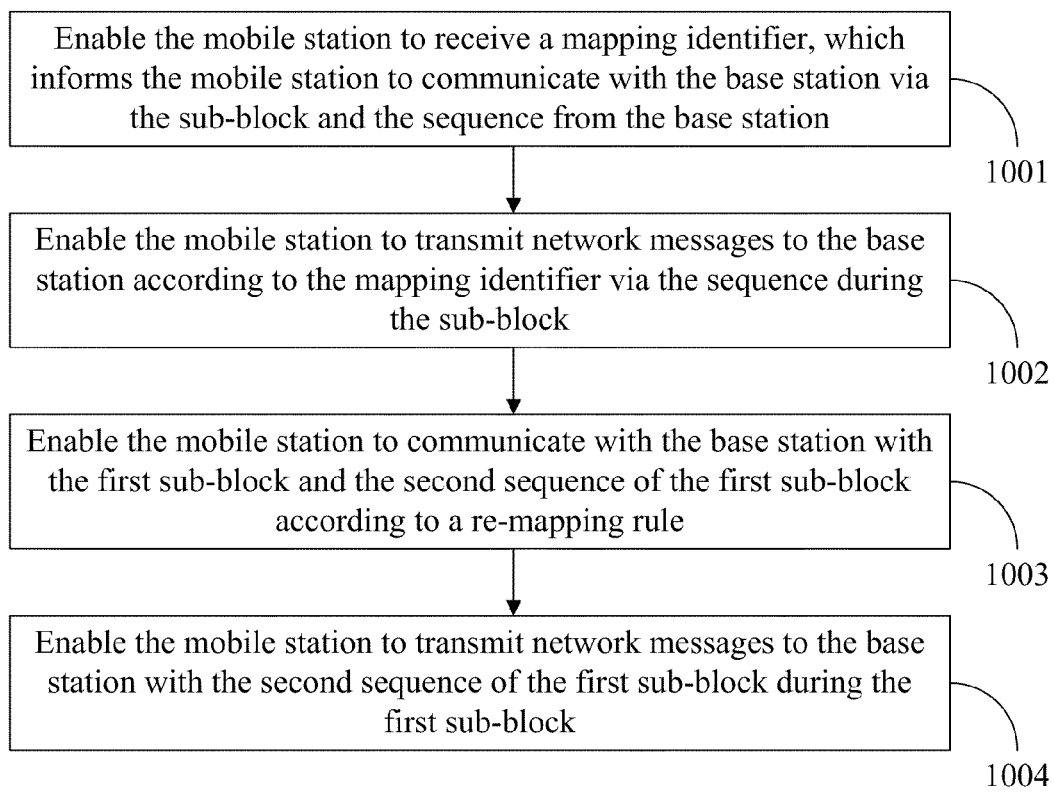
FIG. 10 illustrates the flowcharts of a ninth example embodiment of the present invention.

Please refer to FIG. 10, a ninth embodiment of the present invention is a communication method for use in a mobile station, such as the mobile stations 21-24 in a wireless network. The wireless network comprises a mobile station and the base station. The mobile station connects with the base station via a physical channel. The physical channel comprises a plurality of resource units. Each resource unit comprises a first sub-block. The first sub-block comprises a first sequence and a second sequence.

First, step 1001 is executed to enable the mobile station to receive a mapping identifier from the base station, wherein the mapping identifier informs the mobile station to communicate with the base station with the first sub-block and the first sequence. Next, step 1002 is executed to enable the mobile station to transmit network messages to the base station according to the mapping identifier with the first sequence of the first sub-block during the first sub-block.

Similarly, in order to achieve the re-mapping mechanism, steps 1003-1004 are executed. Step 1003 is executed to enabling the mobile station to communicate with the base station with the first sub-block and the second sequence of the first sub-block according to a re-mapping rule. Then, step 1004 is executed to enable the mobile station to transmit network messages to the base station with the second sequence of the first sub-block during the first sub-block.

Accordingly, based on the above disclosures, the usages of the sub-blocks can be averaged by the dynamic re-mapping mechanism.

According to the above descriptions, a base station, a mobile station and a communication method containing identifying mechanisms of the present invention can solve the problems caused in the prior art, and improve the efficiency of the communications in the wireless network.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication method for a base station, the base station being adapted for use in a wireless network, the wireless network comprising a first mobile station and the base station, the first mobile station being connected with the base station via a physical channel, the physical channel comprising a plurality of resource units, each resource unit comprising a first sub-block, the first sub-block comprising a first sequence, and the communication method comprising the steps of:

(a) enabling the base station to assign a first identifier for both the first sub-block and the first sequence of the first sub-block;

(b) enabling the base station to create a mapping table for recording a first relation of mapping the first identifier to the first mobile station;

(c) enabling the base station to transmit the first identifier to the first mobile station for informing the first mobile station to communicate with the base station with the first sequence of the first sub-block during the first sub-block according to the first relation; and (d) enabling the base station to receive network messages from the first mobile station with the first sequence of the first sub-block during the first sub-block according to the first relation after step (c).

2. The communication method as claimed in claim 1, wherein the wireless network further comprises a second mobile station, the second mobile station connects with the base station via the physical channel, each resource unit further comprises a second sub-block, the second sub-block comprises a first sequence, and the communication method further comprises the following steps after step (d):

(e) enabling the base station to assign a second identifier for both the second sub-block and the first sequence of the second sub-block;

(f) enabling the base station to record a second relation on the mapping table, wherein the second relation maps the second identifier to the second mobile station;

(g) enabling the base station to transmit the second identifier to the second mobile station for informing the second mobile station to communicate with the base station with the first sequence of the second sub-block during the second sub-block according to the second relation; and (h) enabling the base station to receive network messages from the second mobile station with the first sequence of the second sub-block during the second sub-block according to the second relation after step (g).

3. The communication method as claimed in claim 2, further comprising the following steps after step (h):
(i) enabling the base station to modify the first relation to map the first identifier to the second mobile station according to a re-mapping rule;
(j) enabling the base station to modify the second relation to map the second identifier to the first mobile station according to the re-mapping rule; and
(k) enabling the base station to receive network messages from the first mobile station with the first sequence of the second sub-block during the second sub-block according to the second relation and to receive network messages from the second mobile station with the first sequence of the first sub-block during the first sub-block according to the first relation after step (j).

4. The communication method as claimed in claim 1, wherein the wireless network further comprises a second mobile station, the second mobile station connects with the base station via the physical channel, the first sub-block further comprises a second sequence, and the communication further comprises the following steps after step (d):
(e) enabling the base station to assign a second identifier for both the first sub-block and the second sequence of the first sub-block;
(f) enabling the base station to record a second relation on the mapping table, wherein the second relation maps the second identifier to the second mobile station;
(g) enabling the base station to transmit the second identifier to the second mobile station for informing the second mobile station to communicate with the base station with the second sequence of the first sub-block during the first sub-block according to the second relation; and
(h) enabling the base station to receive network messages from the second mobile station with the second sequence of the first sub-block during the first sub-block according to the first relation after step (g).

5. The communication method as claimed in claim 4, further comprising the following steps after step (h):
(i) enabling the base station to modify the first relation to map the first identifier to the second mobile station according to a re-mapping rule;
(j) enabling the base station to modify the second relation to map the second identifier to the first mobile station according to the re-mapping rule; and
(k) enabling the base station to receive network messages from the first mobile station with the second sequence of the first sub-block during the first sub-block according to the second relation and to receive network messages from the second mobile station with the first sequence of the first sub-block during the first sub-block according to the first relation after step (j).

6. The communication method as claimed in claim 1, further comprising the following step after step (d):
(e) enabling the base station to execute a default action according to the first relation of the mapping table.

7. A base station for use in a wireless network, the wireless network comprising a first mobile station and the base station, the first mobile station being connected with the base station via a physical channel, the physical channel comprising a plurality of resource units, each resource unit comprising a first sub-block, the first sub-block comprising a first sequence, and base station comprising:
a processing unit being configured to assign a first identifier for both the first sub-block and the first sequence of the first sub-block, and to create a mapping table for recording a first relation of mapping the first identifier to the first mobile station;
a memory being configured to store the mapping table;
a transceiver being configured to transmit the first identifier to the first mobile station for informing the first mobile station to communicate with the base station with the first sequence of the first sub-block during the first sub-block according to the first relation and to receive network messages from the first mobile station with the first sequence of the first sub-block during the first sub-block according to the first relation.

8. The base station as claimed in claim 7, wherein the wireless network further comprises a second mobile station, the second mobile station connects with the base station via the physical channel, each resource unit further comprises a second sub-block, the second sub-block comprises a first sequence, the processing unit is further configured to assign a second identifier for both the second sub-block and the first sequence of the second sub-block and to record a second relation on the mapping table, the second relation maps the second identifier to the second mobile station, and the transceiver is further configured to transmit the second identifier to the second mobile station for informing the second mobile station to communicate with the base station with the first sequence of the second sub-block during the second sub-block according to the second relation and to receive network messages from the second mobile station with the first sequence of the second sub-block during the second sub-block according to the second relation.

9. The base station as claimed in claim 8, wherein the processing unit is further configured to modify the first relation to map the first identifier to the second mobile station and to modify the second relation to map the second identifier to the first mobile station according to a re-mapping rule, and the transceiver is further configured to receive network messages from the first mobile station with the first sequence of the second sub-block during the second sub-block according to the second relation and to receive network messages from the second mobile station with the first sequence of the first sub-block during the first sub-block according to the first relation.

10. The base station as claimed in claim 7, wherein the wireless network further comprises a second mobile station, the second mobile station connects with the base station via the physical channel, the first sub-block further comprises a second sequence, the processing unit is further configured to assign a second identifier for both the first sub-block and the second sequence of the first sub-block and to record a second relation on the mapping table, the second relation maps the second identifier to the second mobile station, and the transceiver is further configured to transmit the second identifier to the second mobile station for informing the second mobile station to communicate with the base station with the second sequence of the first sub-block during the first sub-block according to the second relation and to receive network messages from the second mobile station with the second sequence of the first sub-block during the first sub-block according to the first relation.

11. The base station as claimed in claim 10, wherein the processing unit is further configured to modify the first relation to map the first identifier to the second mobile station and to modify the second relation to map the second identifier to the first mobile station, the transceiver is further configured to receive network messages from the first mobile station with the second sequence of the first sub-block during the first sub-block according to the second relation and to receive network messages from the second mobile station with the first sequence of the first sub-block during the first sub-block according to the first relation.

12. The base station as claimed in claim 7, wherein the processing unit is further configured to execute a default action according to the first relation of the mapping table.

13. A communication method for a mobile station, the mobile station being adapted for use in a wireless network, the wireless network comprising a base station and the mobile station, the mobile station connecting with the base station via a physical channel, the physical channel comprising a plurality of resource units, each resource unit comprising a first sub-block, the first sub-block comprising a first sequence, and the communication method comprising the following steps:
(a) enabling the mobile station to receive a mapping identifier from the base station, wherein the mapping identifier informs the mobile station to communicate with the base station with the first sub-block and the first sequence of the first sub-block;
(b) enabling the mobile station to transmit network messages to the base station with the first sequence of the first sub-block during the first sub-block according to the mapping identifier.

14. The communication method as claimed in claim 13, wherein each resource unit further comprises a second sub-block, the second sub-block comprises a first sequence, and the communication method further comprises the following steps after step (b):
(c) enabling the mobile station to communicate with the base station with the second sub-block and the first sequence of the second sub-block according to a re-mapping rule; and
(d) enabling the mobile station to transmit network messages to the base station with the first sequence of the second sub-block during the second sub-block after step (c).

15. The communication method as claimed in claim 13, wherein the first sub-block comprises a second sequence, and the communication method further comprises the following steps after step (b):
(c) enabling the mobile station to communicate with the base station with the first sub-block and the second sequence of the first sub-block according to a re-mapping rule; and
(d) enabling the mobile station to transmit network messages to the base station with the second sequence of the first sub-block during the first sub-block after step (c).

16. A mobile station for use in a wireless network, the wireless network comprising the mobile station and a base station, the mobile station connecting with the base station via a frequency channel, the frequency channel comprising a plurality of resource units, each resource unit comprising a first sub-block, the first sub-block comprising a first sequence, and the mobile station comprising:
a transceiver being configured to receive a mapping identifier, which informs the mobile station to communicate with the base station with the first sub-block and the first sequence of the first sub-block, from the base station, and to transmit network messages to the base station according to the mapping identifier with the sequence during the sub-block.

17. The mobile station as claimed in claim 16, wherein each resource unit further comprises a second sub-block, the second sub-block comprises a first sequence, the transceiver is further configured to communicate with the base station with the second sub-block and the first sequence of the second sub-block according to a re-mapping rule, and to transmit network messages to the base station with the first sequence of the second sub-block during the second sub-block.

18. The mobile station as claimed in claim 16, wherein the first sub-block comprises a second sequence, the transceiver is further configured to communicate with the base station with the first sub-block and the second sequence of the first sub-block according to a re-mapping rule, and to transmit network messages to the base station with the second sequence of the first sub-block during the first sub-block.

* * * * *